United States Patent
Kim et al.

(10) Patent No.: US 9,758,920 B2
(45) Date of Patent: Sep. 12, 2017

(54) CLOTHES TREATING APPARATUS WITH DETECTING DEVICE FOR INSERTION OF FILTER

(71) Applicant: LG ELECTRONICS INC., Seoul (KR)

(72) Inventors: Jeongyun Kim, Seoul (KR); Sangik Lee, Seoul (KR)

(73) Assignee: LG Electronics Inc., Seoul (KR)

(*) Notice: Subject to any disclaimer, the term of this patent is extended or adjusted under 35 U.S.C. 154(b) by 11 days.

(21) Appl. No.: 14/980,597

(22) Filed: Dec. 28, 2015

(65) Prior Publication Data

US 2016/0115640 A1   Apr. 28, 2016

Related U.S. Application Data

(63) Continuation of application No. 13/739,105, filed on Jan. 11, 2013, now Pat. No. 9,250,016.

(30) Foreign Application Priority Data

Jan. 11, 2012   (KR) .................. 10-2012-0003550

(51) Int. Cl.
| | |
|---|---|
| *F26B 21/00* | (2006.01) |
| *D06F 58/04* | (2006.01) |
| *D06F 58/22* | (2006.01) |
| *D06F 58/28* | (2006.01) |

(Continued)

(52) U.S. Cl.
CPC ............. *D06F 58/22* (2013.01); *D06F 58/04* (2013.01); *D06F 58/28* (2013.01); *F26B 21/003* (2013.01); *G01V 3/08* (2013.01); *H01H 36/004* (2013.01); *D06F 2058/2858* (2013.01); *H01H 2231/012* (2013.01)

(58) Field of Classification Search
CPC .......... D06F 58/22; D06F 58/28; D06F 58/04; D06F 2058/2858; H01H 36/004; H01H 2231/012; G01V 3/08; F26B 21/003
See application file for complete search history.

(56) References Cited

U.S. PATENT DOCUMENTS

| | | | |
|---|---|---|---|
| 7,363,780 B2 | 4/2008 | Lee | |
| 9,250,016 B2* | 2/2016 | Kim | ..................... F26B 21/003 |
| 2003/0154618 A1 | 8/2003 | Treu | |

(Continued)

FOREIGN PATENT DOCUMENTS

| | | |
|---|---|---|
| CN | 1517476 A | 8/2004 |
| CN | 101168921 A | 4/2008 |

(Continued)

OTHER PUBLICATIONS

United Kingdom Office Action dated Apr. 22, 2013 for GB Application No. 1300593.9, in English, 3 pages.

(Continued)

*Primary Examiner* — Jiping Lu
(74) *Attorney, Agent, or Firm* — Fish & Richardson P.C.

(57) ABSTRACT

A clothes treating apparatus includes a filter insertion detecting device that detects whether a filter has been inserted in the clothes treating apparatus. The filter insertion detecting device, which is installed in a clothes drying machine or the like, may be moved in response to insertion of a filter assembly to generate a contact signal that indicates insertion of the filter assembly.

20 Claims, 16 Drawing Sheets

(51) Int. Cl.
*G01V 3/08* (2006.01)
*H01H 36/00* (2006.01)

(56) References Cited

U.S. PATENT DOCUMENTS

| | | |
|---|---|---|
| 2004/0139556 A1 | 7/2004 | Lee |
| 2009/0064528 A1 | 3/2009 | Kim |
| 2011/0016736 A1 | 1/2011 | Kim |

FOREIGN PATENT DOCUMENTS

| | | |
|---|---|---|
| CN | 101187141 A | 5/2008 |
| DE | 102004055941 | 5/2006 |
| DE | 102008045525 | 3/2009 |
| DE | 112009001012 | 2/2011 |
| EP | 0 106 289 A3 | 4/1986 |
| EP | 3 95 598 A1 | 10/1990 |
| EP | 0443361 | 8/1991 |
| EP | 1 439 253 A1 | 7/2004 |
| JP | 04-197396 A | 7/1992 |
| JP | 06-335588 A | 12/1994 |
| JP | 2000-084295 A | 3/2000 |
| JP | 2005-253990 A | 9/2005 |
| JP | 2007-117137 A | 5/2007 |
| KR | 10-0664507 B1 | 1/2007 |

OTHER PUBLICATIONS

Chinese Office Action dated Sep. 11, 2014 for Chinese Application No. 201310010220.8, with English Translation, 26 pages.
Yiqhmg Yang et al.; "Control Device"; China WaterPower Press (Rd. 6, Sanlihelu, Beijing, 100044)' dated Sep. 30, 2005, with English Abstract.
Office Action issued in German Application No. 102013000446.2 on Mar. 18, 2016, 19 pages, with English translation.

\* cited by examiner

CLOTHES TREATING APPARATUS WITH DETECTING DEVICE FOR INSERTION OF FILTER

CROSS-REFERENCE TO RELATED APPLICATION

This application is a continuation of U.S. application Ser. No. 13/739,105, filed Jan. 11, 2013, now allowed, which claims the benefit of earlier filing date and right of priority to Korean Application No. 10-2012-0003550, filed on Jan. 11, 2012, the entire content of each of the prior applications is incorporated by reference herein.

FIELD

This specification relates to a clothes treating apparatus having a drying function and equipped with a filter.

BACKGROUND

In general, a clothes treating apparatus refers to an apparatus having at least one of a dehydrating function and a drying function for clothes (or laundry). For example, a drying machine as an example clothes treating apparatus is an apparatus for drying an object by introducing the object into a drum and evaporating moisture contained in the object by supplying hot air into the drum. A washing machine having a drying function is an apparatus capable of drying clothes, which have been dehydrated after washed, with hot air.

Air which is discharged out of a drum after evaporating moisture within the clothes during a drying process is in a state of high temperature and high humidity. Drying machines may be classified according to a method of treating the air of high temperature and high humidity. For example, drying machines may be classified into a condensing type drying machine in which air of high temperature and high humidity circulates without being discharged out of the drying machine to cause heat exchange in a heat exchanger so that moisture contained in the air of high temperature and high humidity can be condensed, and an exhausting type drying machine of discharging air of high temperature and high humidity which has passed through a drum directly to the outside.

In addition, air which is discharged out of a drum after being used for drying an object may contain foreign materials, such as lint coming apart from the object. The foreign materials may be collected within the clothes treating apparatus while moving together with the air. Therefore, a filter may be used for filtering the foreign materials.

When foreign materials are collected in the filter by more than a predetermined level, they interfere with the flow of air. Hence, a regular cleaning of the filter is performed. For example, a user first detaches a filter or a filter assembly from the clothes treating apparatus for cleaning, removes foreign materials from the filter, and attaches it back to the clothes treating apparatus.

SUMMARY

In one aspect, a clothes treating apparatus includes a drum defining a cavity that receives clothes to be dried and a cabinet that houses the drum and that defines an opening to enable loading of clothes into the drum and unloading of clothes from the drum. The clothes treating apparatus also includes a filter assembly configured to filter foreign materials included in air discharged from the drum and a filter guide that defines a conduit that receives at least a portion of the filter assembly. The clothes treating apparatus further includes a filter insertion detecting device configured to detect insertion of the filter assembly into the filter guide. The filter insertion detecting device includes an electrode sensor configured to move in response to insertion of the filter assembly into the filter guide and generate a contact signal based on movement that occurs in response to insertion of the filter assembly into the filter guide.

Implementations may include one or more of the following features. For example, the electrode sensor may include a printed circuit board terminal connected to a printed circuit board and a connection terminal configured to connect to the printed circuit board terminal based on insertion of the filter assembly into the filter guide and disconnect from the printed circuit board terminal based on removal of the filter assembly from the filter guide. In this example, the printed circuit board terminal may include first and second terminals connected to a circuit of the printed circuit board.

In some implementations, the connection terminal may be configured to contact the first and second terminals to electrically connect the circuit of the printed circuit board based on insertion of the filter assembly into the filter guide. In these implementations, the connection terminal may be mounted on the filter assembly and the printed circuit board terminal may be mounted at the filter guide.

In some examples, the clothes treating apparatus may include a filter cover mounted at the filter guide and configured to open and close the conduit defined by the filter guide based on insertion of the filter assembly into the filter guide and removal of the filter assembly from the filter guide. In these examples, the connection terminal may be configured to contact the first and second terminals to electrically connect the circuit of the printed circuit board based on rotation of the filter cover caused by insertion of the filter assembly into the filter guide. Further, in these examples, the connection terminal may be mounted on the filter cover and the printed circuit board terminal may be mounted at the filter guide.

In another aspect, a clothes treating apparatus includes a drum defining a cavity that receives clothes to be dried and a cabinet that houses the drum and that defines an opening to enable loading of clothes into the drum and unloading of clothes from the drum. The clothes treating apparatus also includes a filter assembly configured to filter foreign materials included in air discharged from the drum and a filter guide that defines a conduit that receives at least a portion of the filter assembly. The clothes treating apparatus further includes a filter insertion detecting device configured to detect insertion of the filter assembly into the filter guide. The filter insertion detecting device includes a switch configured to be pressed in response to insertion of the filter assembly into the filter guide and generate a contact signal based on being pressed in response to insertion of the filter assembly into the filter guide.

Implementations may include one or more of the following features. For example, the switch may include a button configured to electrically connect a circuit of a printed circuit board based on pressure applied to the button and electrically disconnect the circuit of the printed circuit board based on release of pressure applied to the button. In this example, the switch also may include a pressing member configured to press the button based on insertion of the filter assembly into the filter guide.

In some implementations, the pressing member may include an elastic portion that is configured to press the button based on an external force applied to the elastic portion due to insertion of the filter assembly into the filter guide and that is configured to release the button based on the external force being released due to removal of the filter assembly from the filter guide. In these implementations, the pressing member also may include a pressing portion configured to contact and press the button in response to the applied external force.

In addition, the switch may be mounted at the filter guide and the pressing member may be configured to press the button in response to being pressed by the filter assembly when the filter assembly is inserted in the filter guide.

In some examples, the clothes treating apparatus may include a filter cover mounted at the filter guide and configured to open and close the conduit defined by the filter guide based on insertion of the filter assembly into the filter guide and removal of the filter assembly from the filter guide. In these examples, the filter cover may be configured to press the pressing member based on rotation of the filter cover caused by insertion of the filter assembly into the filter guide. Also, in these examples, the switch may be mounted at the filter guide.

In yet another aspect, a clothes treating apparatus includes a drum defining a cavity that receives clothes to be dried and a cabinet that houses the drum and that defines an opening to enable loading of clothes into the drum and unloading of clothes from the drum. The clothes treating apparatus also includes a filter assembly configured to filter foreign materials included in air discharged from the drum and a filter guide that defines a conduit that receives at least a portion of the filter assembly. The clothes treating apparatus further includes a filter insertion detecting device configured to detect insertion of the filter assembly into the filter guide. The filter insertion detecting device is configured to move based on a magnetic force applied to the filter insertion detecting device in response to insertion of the filter assembly into the filter guide and generate a contact signal based on movement caused by the magnetic force.

Implementations may include one or more of the following features. For example, the filter insertion detecting device may include a reed switch comprising first and second terminals spaced apart from each other in an overlapping manner. In this example, the reed switch is electrically connected when the first and second terminals contact each other. Further, in this example, the filter insertion detecting device may include a magnet configured to apply a magnetic force that causes the first and second terminals of the reed switch to contact each other.

In some implementations, the reed switch may be electrically connected by the magnetic force of the magnet based on insertion of the filter assembly into the filter guide. In these implementations, the reed switch may be mounted at the filter guide and the magnet may be mounted on the filter assembly.

In some examples, the clothes treating apparatus includes a filter cover mounted at the filter guide and configured to open and close the conduit defined by the filter guide based on insertion of the filter assembly into the filter guide and removal of the filter assembly from the filter guide. In these examples, the reed switch may be electrically connected by the magnetic force of the magnet based on rotation of the filter cover caused by insertion of the filter assembly into the filter guide.

Further, the reed switch may be mounted at the filter guide and the magnet may be mounted on the filter cover. In addition, the reed switch may be positioned in a hermetic space such that the first and second terminals are disconnected from each other within the hermetic space.

DETAILED DESCRIPTION

Figure 1:
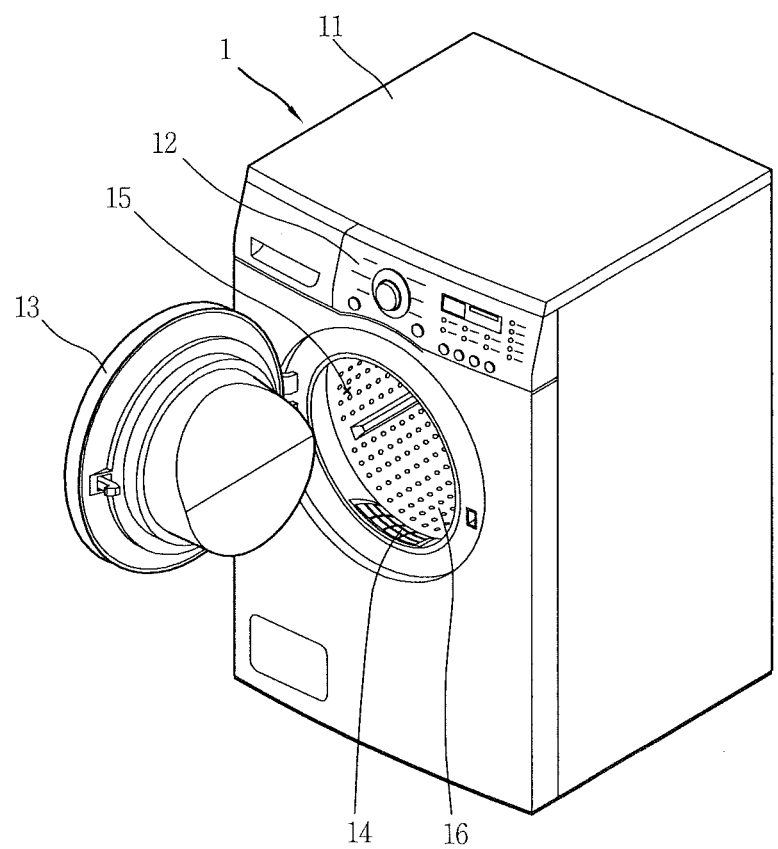
FIG. 1 is a schematic view showing an example clothes treating apparatus having an example filter insertion detecting device.

FIG. 1 illustrates an example clothes drying machine. Although FIG. 1 illustrates a drying machine, the present disclosure is not limited only to drying machines and the techniques and structures described throughout the disclosure may be applicable to any type of clothes treating apparatus that dries clothes by supplying air or hot air into a drum, such as a washing machine having a drying function and the like.

As shown in FIG. 1, a clothes drying machine 1 may include a cabinet 11 as a main body having a door 13 at its front surface, and a drum 16 rotatably installed within the cabinet 11 and having a plurality of lifters protruding from an inner circumferential surface. Also, a control panel 12 having a display window and manipulation buttons may be provided on the front surface of the cabinet 11.

The drum 16 may be rotated by a driving motor within the cabinet 11, and communicate with a circulation duct. Accordingly, heated air is introduced into the drum 16 from the circulation duct which communicates with the rear of the drum 16 so as to dry an object to be dried within the drum 16.

Air used for drying includes moisture evaporated from the object to be dried so as to become humid. The humid air may be introduced into a filter inlet 14 disposed near an opening 15 (referred to as an introduction opening) of the cabinet 11, which is located at the front surface of the drum 16. After being introduced into the filter inlet 14, the air passes through a filter. Foreign materials which may be included in the humid air may be filtered off by the filter disposed between the front side of the drum 16 and the circulation duct. Such air may flow more efficiently by virtue of a blowing fan disposed in the circulation duct.

Figure 2:
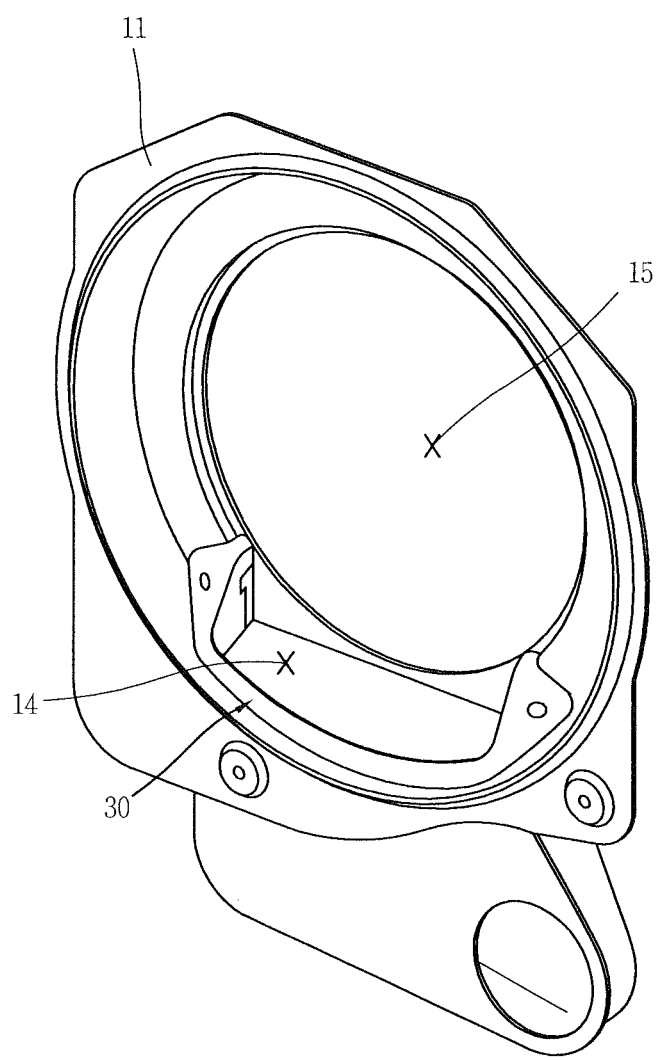
FIG. 2 is a view showing an example filter guide.
Figure 3:
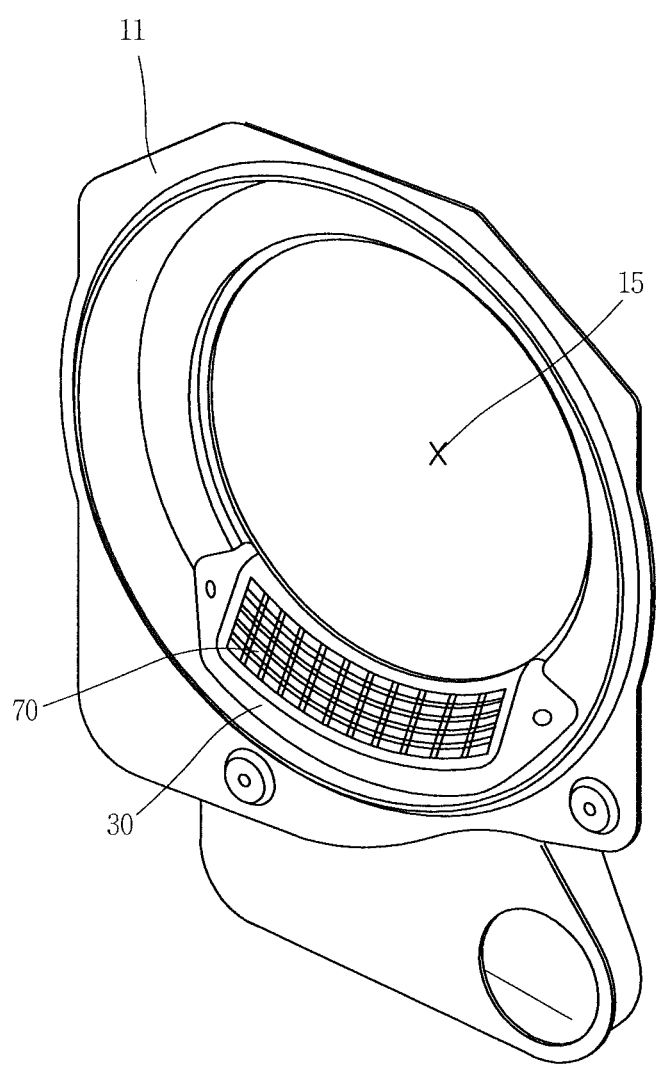
FIG. 3 is a view showing a state in which an example filter assembly is inserted into the example filter guide.

FIG. 2 shows an example filter guide 30, and FIG. 3 shows a state in which an example filter assembly 70 is inserted in the filter guide 30 shown in FIG. 2. A filter may be implemented as the filter assembly 70, and inserted into an open space of the filter guide 30 to filter off foreign materials or lint generated while drying clothes within the drum 16. The filter guide 30 is a member that defines the filter inlet 14 and a conduit for insertion of the filter assembly 70. The filter guide 30 may be installed below the introduction opening 15 with its upper portion open.

The filter assembly 70 may be pulled out of the filter guide 30. The filter assembly 70 may be cleaned to remove foreign materials therefrom and reinserted into the filter guide 30 or a new filter assembly may be inserted into the filter guide 30.

In addition, the clothes drying machine may include a heat exchanger which executes heat exchange with air circulating within the circulation duct. The heat exchanger may adsorb heat from air of high temperature and high humidity so as to condense moisture in the air for removal.

The circulated air, which has been dried with moisture removed, may be heated again by the heat exchanger or a heater to become hot and dry. The hot and dry air may then be introduced back into the drum 16 via the circulation duct.

Figure 4:
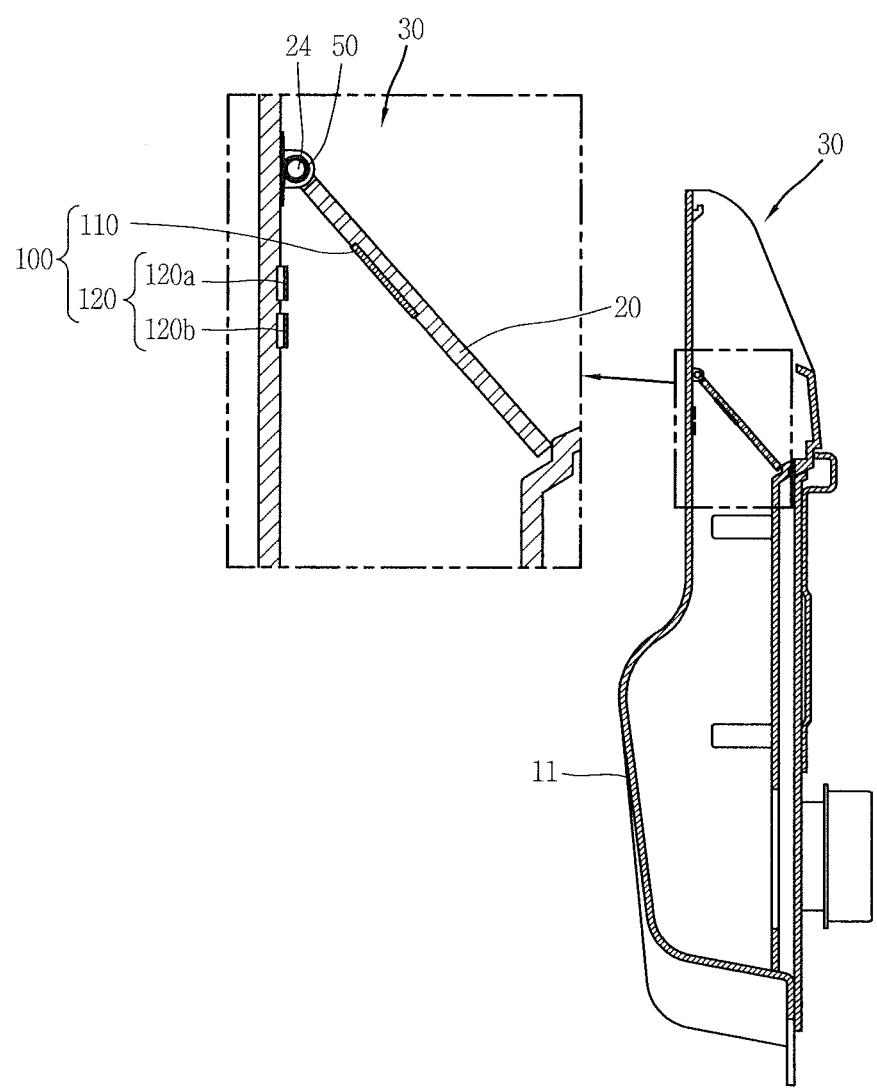
FIGS. 4 to 9 are views showing a first example filter insertion detecting device.

FIGS. 4 to 21 illustrate examples of a filter insertion detecting device and a clothes treating apparatus using the same. As shown in FIG. 4, the filter guide 30 has an open upper portion, so a filter cover 20 may be provided to prevent foreign materials from being introduced into the circulation duct when the filter assembly 70 is not inserted. The filter cover 20 typically has a structure of closing the open portion of the filter guide 30. In detail, the filter cover 20 may have a structure of being naturally open by being pushed as the filter assembly 70 is inserted, and closed by a separate elastic member such as a torsion spring or the like, without an external force, when the filter assembly 70 is drawn out.

FIGS. 4 to 9 show a first example filter insertion detecting device. The filter insertion detecting device may include an electrode sensor 100, which detects whether or not the filter assembly 70 has been inserted into the filter guide 30.

The electrode sensor 100 may generate a contact signal by being moved as the filter assembly 70 is inserted. The electrode sensor 100 may include a printed circuit board (PCB) terminal 120 as a circuit terminal connected to a PCB, and a connection terminal 110 for electrically connecting the PCB terminal 120 in a selective manner.

Referring to FIGS. 4 to 9, the PCB terminal 120 may include a first terminal 120*a* and a second terminal 120*b* connected to a circuit of the PCB.

In some examples, the connection terminal 110 may be mounted onto a lower surface of the filter cover 20, and the PCB terminal 120 may be mounted onto an inner wall of the filter guide 30. When the filter assembly 70 is inserted, the filter cover 20 is rotated, and accordingly the connection terminal 110 contacts the PCB terminal 120 mounted onto the inner wall of the filter guide 30 so that the PCB terminal 120 can be electrically connected.

Figure 5:
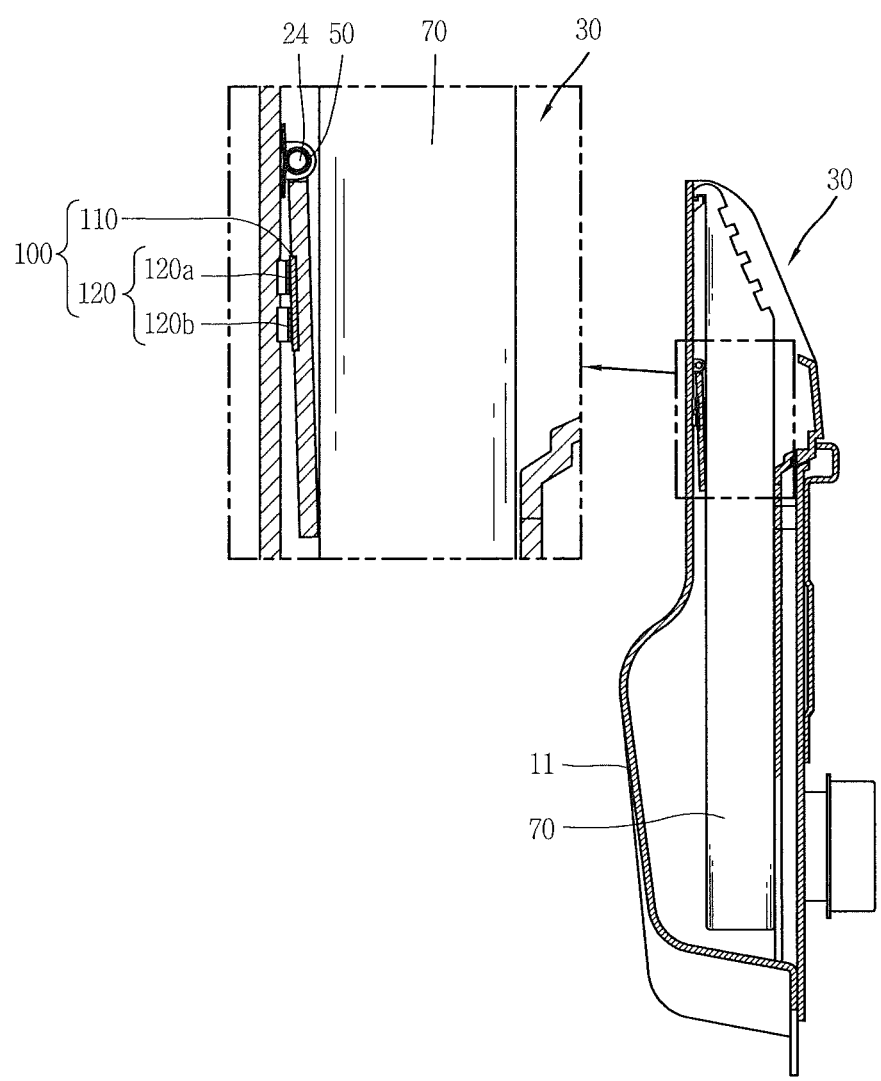

The filter cover 20, as shown in FIGS. 4 and 5, may be fixed onto a rear side wall within the filter guide 30 so as to be rotatable based on a hinge.

Figure 8:
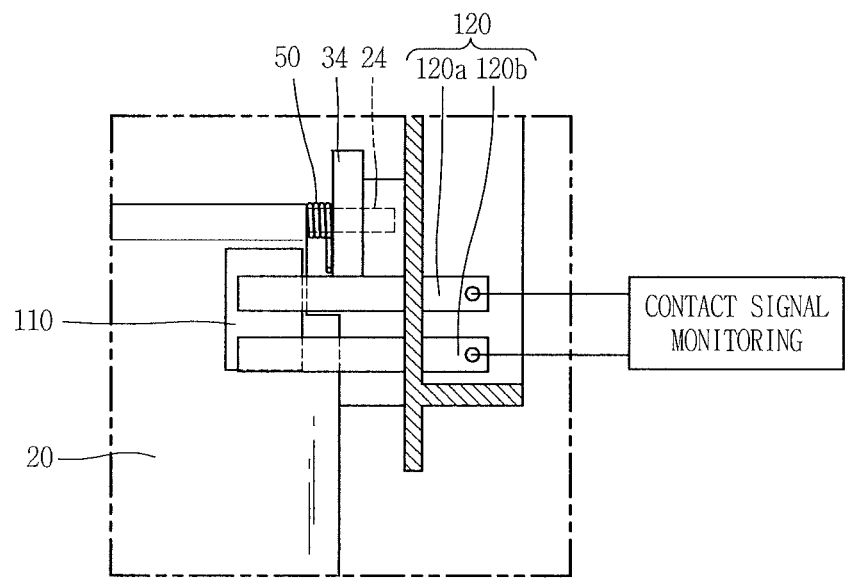
Figure 9:
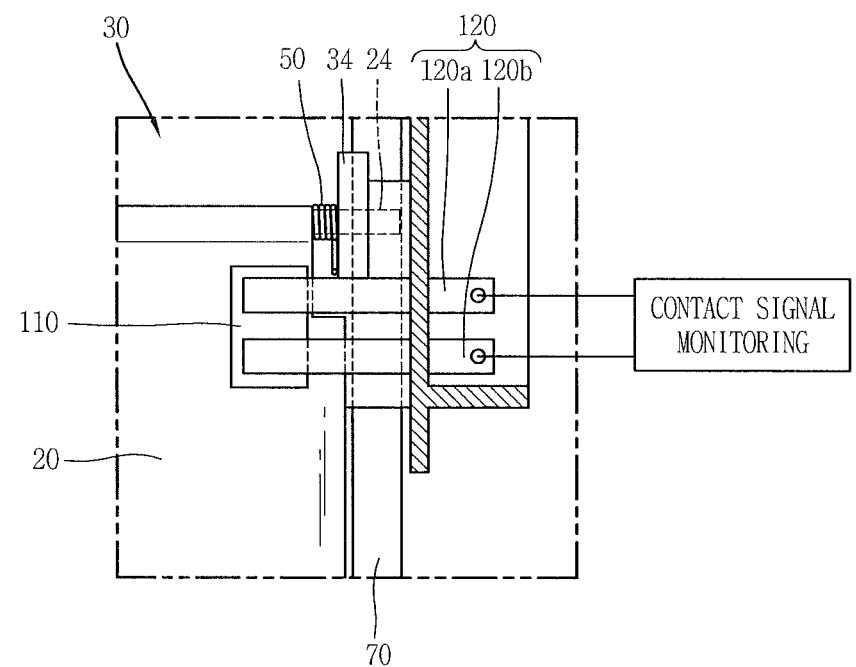

Referring to FIGS. 8 and 9, the filter cover 20 may include filter hinge shafts 24 protruding from both sides thereof, and each of the filter hinge shafts 24 may be inserted into a corresponding hinge shaft hole 34 provided on a side wall of the filter guide 30. The filter cover 20 may open or close an open space of the upper portion of the filter guide 30 by being rotated based on the hinge shaft holes 34 as a rotational shaft.

Also, the filter insertion detecting device may further include a torsion spring 50 disposed at the hinge shaft hole 34 of the filter guide 30 to maintain the filter cover 20 in a closed state by an elastic restoring force. Accordingly, the filter cover 20 may remain in a closed state by being upwardly moved by the elastic restoring force of the torsion spring 50 when the filter assembly 70 is not inserted, while changing into an open state in response to the hinge-based rotation when the filter assembly 70 is inserted.

Referring to FIGS. 4 and 5, without the filter assembly 70 inserted, the PCB terminal 120 mounted onto the inner wall of the filter guide 30 is not electrically connected as shown in FIG. 4, and accordingly a contact signal is not generated. Accordingly, the contact signal monitoring circuit determines that the filter has not been inserted.

On the contrary, when the filter cover 20 contacts the inner wall of the filter guide 30 in response to the insertion of the filter assembly 70, the connection terminal 110 mounted onto the lower surface of the filter cover 20 electrically connects the PCB terminal 120 mounted onto the inner wall of the filter guide 30, thereby generating a contact signal.

Accordingly, the connection terminal 110 electrically connects the first terminal 120*a* and the second terminal 120*b* of the PCB terminal 120 to each other so as to make a current flow on the circuit of the PCB, thereby enabling detection that the filter assembly 70 has been inserted.

Figure 6:
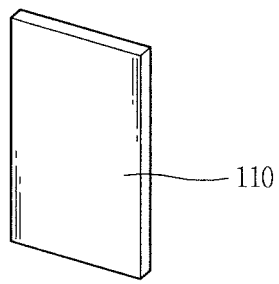
Figure 7:
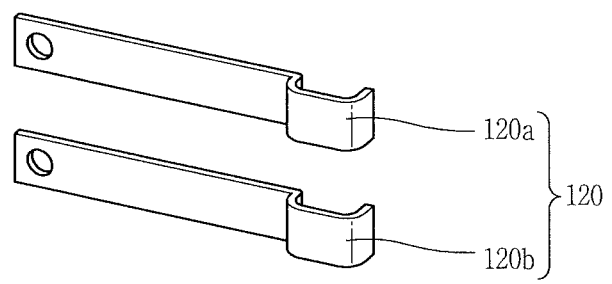

FIGS. 6 and 7 show the connection terminal 110 and the PCB terminal 120 of the electrode sensor 100. The connection terminal 110 may be a conductor through which a current flows. The connection terminal 110 may electrically connect the first terminal 120*a* and the second terminal 120*b* of the PCB terminal 120, which are spaced apart from each other.

Referring to FIGS. 8 and 9, when the filter cover 20 closes the filter inlet 14 without insertion of the filter assembly 70, as shown in FIG. 8, the PCB terminal 120 is not electrically connected and accordingly maintained in an off-state without generating a contact signal. The contact signal monitoring circuit may recognize the off-state as non-insertion of a filter.

However, when the filter assembly 70 is inserted as shown in FIG. 9, the filter cover 20 may be rotated such that the first terminal 120*a* and the second terminal 120*b* of the PCB terminal 120 can be electrically connected to each other by the connection terminal 110. Accordingly, the contact signal monitoring circuit detects an insertion of a filter. As such, whether or not the filter has been inserted may be detected by a contact signal generated from the electrode sensor 100.

Figure 10:
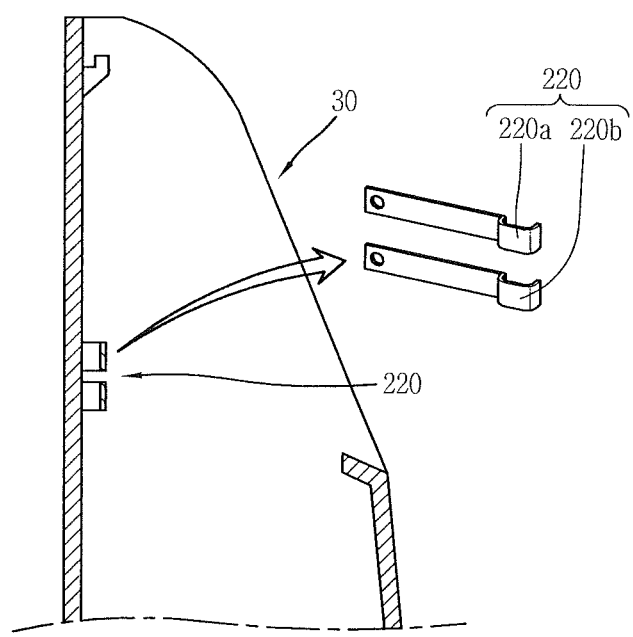
FIGS. 10 and 11 are views showing a second example filter insertion detecting device.
Figure 11:
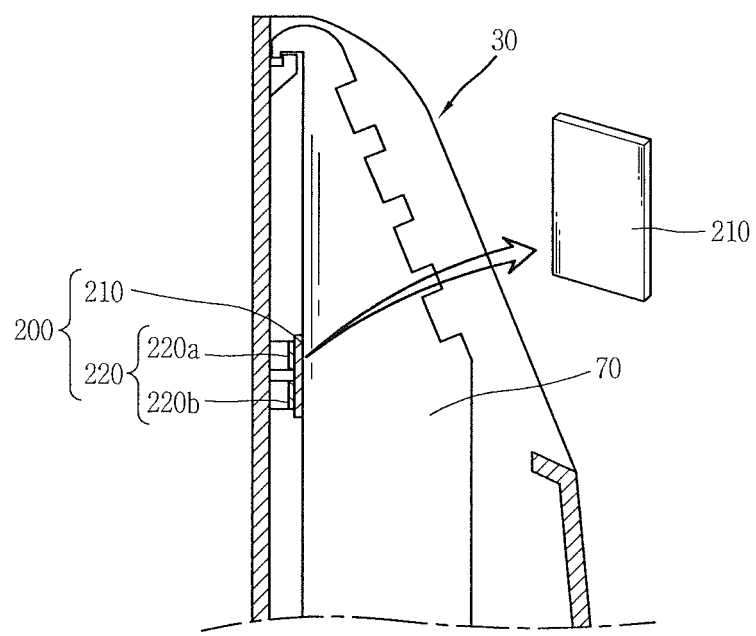

FIGS. 10 and 11 show a second example filter insertion detecting device installed in an example clothes treating apparatus. The clothes treating apparatus has the same configuration as that of the clothes drying machine described above, except for a different configuration of the filter insertion detecting device. Therefore, description of the same configuration is not repeated.

Referring to FIGS. 10 and 11, a connection terminal 210 may be mounted onto an outer wall of the filter assembly 70 and a PCB terminal 220 may be mounted onto an inner wall of the filter guide 30. Accordingly, when the filter assembly 70 is inserted, the connection terminal 210 may contact the PCB terminal 220 of the filter guide 30 to electrically connect the PCB terminal 220. The connection results in generation of a contact signal that the contact signal monitoring circuit detects to determine insertion of a filter.

In some implementations, the connection terminal 210 may not be mounted onto the lower surface of the filter cover 20, but mounted onto the outer wall of the filter assembly 70. With this configuration, when the filter assembly 70 is inserted into the filter guide 30 without a filter cover, the connection terminal 210 mounted onto the outer wall of the filter assembly 70 may electrically connect a first terminal 220*a* and a second terminal 220*b* of the PCB terminal 220 to each other. Accordingly, the PCB terminal 220 may be electrically connected, so as to generate a contact signal, resulting in detecting the insertion of the filter assembly 70.

Figure 12:
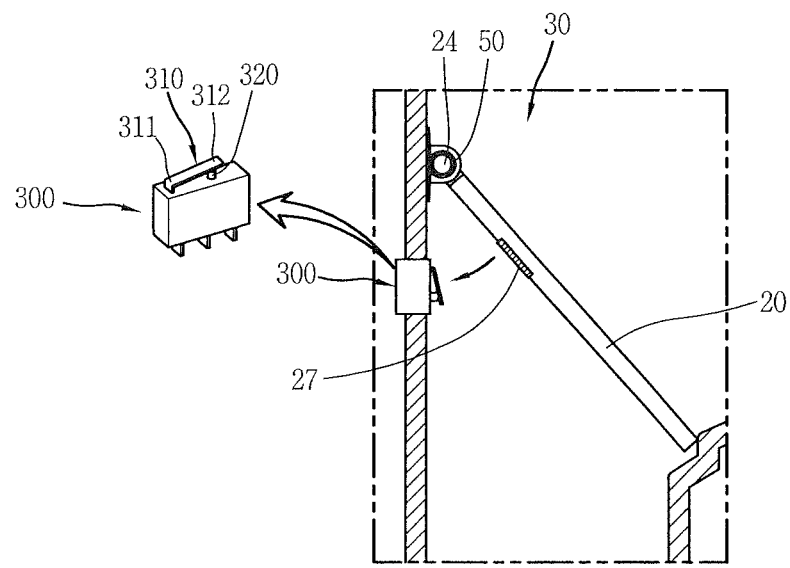
FIGS. 12 and 13 are views showing a third example filter insertion detecting device.
Figure 13:
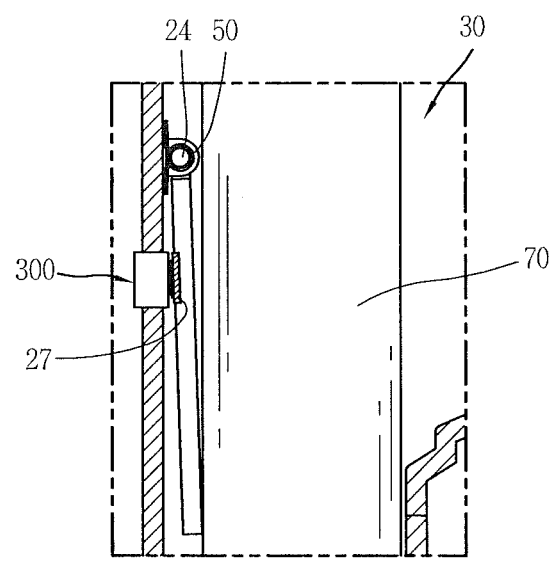

FIGS. 12 and 13 show a third example filter insertion detecting device installed in an example clothes treating apparatus. The clothes treating apparatus has the same configuration as that of the clothes drying machine described above, except for a different configuration of the filter insertion detecting device. Therefore, description of the same configuration is not repeated.

The clothes treating apparatus may include a filter guide 30, a filter assembly 70, and a filter cover 20. Also, the filter insertion detecting device may include a switch 300 which generates a contact signal by being pressed as the filter assembly 70 is inserted into the filter guide 30.

The switch 300 may include a button 320 for electrically connecting a circuit of a PCB in a switch-on/off manner, and a pressing member 310 for pressing the button 320 when the filter assembly 70 is inserted.

The pressing member 310 may include an elastic portion 311 which presses the button 320 when an external force is applied and is restored to remove the force applied to the button 320 when the external force is released, and a pressing portion 312 which presses the button 320 by the external force in a contacting manner.

As shown, the switch 300 may be mounted onto an inner wall of the filter guide 30. When the filter assembly 70 is inserted into the filter guide 30, the filter cover 20 is folded such that a lower surface of the filter cover 20 presses the pressing member 310 of the switch 300 mounted onto the inner wall of the filter guide 30, thereby generating a contact signal.

The lower surface of the filter cover 20 may also be provided with a pressing plate 27, which presses the pressing member 310 of the switch 300.

The switch 300 may be a micro switch or a typical switch, which can check an on/off state. The switch 300 may be switched on as the pressing portion 312 of the pressing member 310 presses the button 320.

Accordingly, when the filter assembly 70 is inserted, the filter cover 20 may be rotated to press the pressing member 310 of the switch 300 mounted onto the inner wall of the filter guide 30. Pressing the pressing member 310 of the switch 300 results in generation of a contact signal that enables detection of insertion of the filter.

When the filter assembly 70 is not inserted, the filter cover 20 may enter a closed state and accordingly a force applied to the pressing member 310 of the switch 300 may be removed. In turn, the pressing member 310 may be restored to the original position by the elastic portion 311 and thus the force applied by the pressing portion 312 to the button 320 may be released. Therefore, the switch 300 may be electrically disconnected and not generate a contact signal. Accordingly, the contact signal monitoring circuit detects that the filter has not been inserted.

Figure 14:
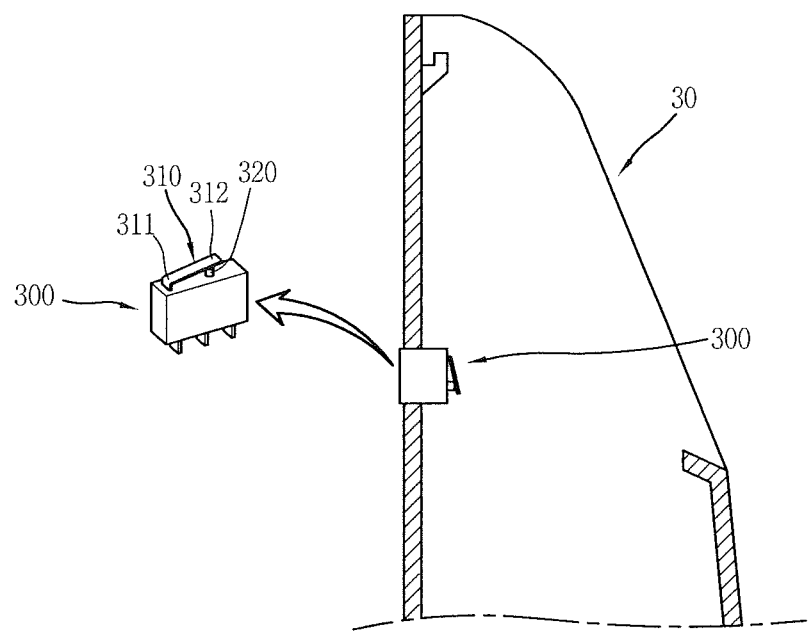
FIGS. 14 and 15 are views showing a fourth example filter insertion detecting device.
Figure 15:
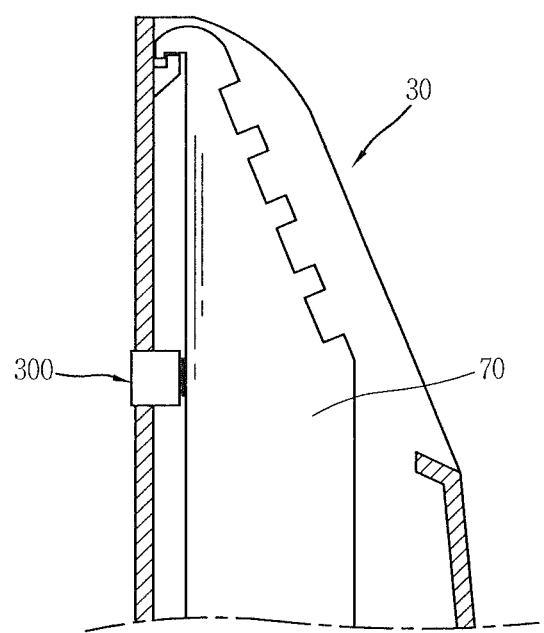

FIGS. 14 and 15 show a fourth example filter insertion detecting device installed in an example clothes treating apparatus. The clothes treating apparatus has the same configuration as that of the clothes drying machine described above, except for a different configuration of the filter insertion detecting device. Therefore, description of the same configuration is not repeated.

In some examples, the switch 300 may be mounted onto an inner wall of the filter guide 30. When the filter assembly 70 is inserted, the pressing member 310 may be pressed by the outer wall of the filter assembly 70 and in turn press the button 320, thereby generating a contact signal.

A filter cover may not be provided at the filter guide 30. When the filter assembly 70 is inserted, the pressing member 310 of the switch 300 may be pressed by a side wall of the filter assembly 70 so as to electrically connect the button 320.

FIGS. 16 to 19 show a fifth example filter insertion detecting device installed in an example clothes treating apparatus. The clothes treating apparatus has the same configuration as that of the clothes drying machine described above, except for a different configuration of the filter insertion detecting device. Therefore, description of the same configuration is not repeated.

The clothes treating apparatus may include a filter guide 30, a filter assembly 70, and a filter cover 20. The filter insertion detecting device may be moved by a magnetic force as the filter assembly 70 is inserted into the filter guide 30, thereby generating a contact signal.

The filter insertion detecting device may detect whether or not a filter has been inserted in the filter guide 30. The filter insertion detecting device is equipped with a reed switch 420 having first and second terminals 421 and 422 spaced apart from each other in an overlapping manner and electrically connected when the terminals contact each other. The filter insertion detecting device also includes a magnet 410 that causes the terminals of the reed switch 420 to contact each other by applying a magnetic force.

The reed switch 420 may be mounted onto an inner wall of the filter guide 30, and the magnet 410 may be mounted onto a lower surface of the filter cover 20. When the filter assembly 70 is inserted, the filter cover 20 may be folded onto an inner wall of the filter guide 30 to electrically connect the reed switch 420 by the magnetic force of the magnet 410, thereby generating a contact signal.

Figure 16:
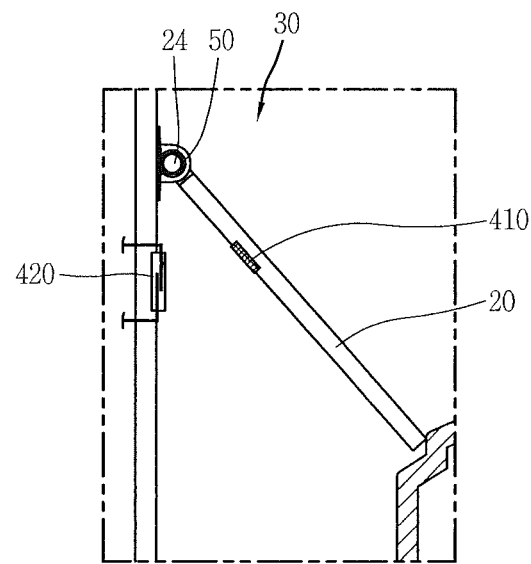
FIGS. 16 to 19 are views showing a fifth example filter insertion detecting device.
Figure 17:
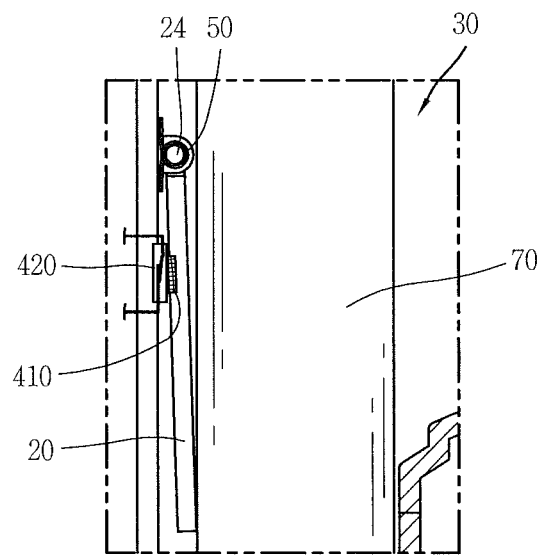

As shown in FIGS. 16 and 17, electrically connecting the reed switch 420 as the filter cover 20 is rotated in response to insertion of the filter assembly 70, is similar to the examples described above using the electrode sensor 100.

The magnet 410 may be employed to electrically connect the disconnected first and second terminals 421 and 422 of the reed switch 420 to each other. The magnet 410 may be formed with a general permanent magnet so as to pull or push a magnetic substance when the magnetic substance approaches.

Figure 18:
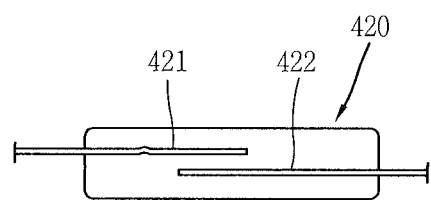
Figure 19:
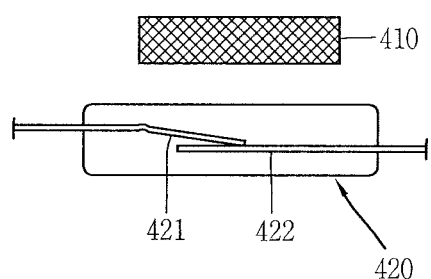

The reed switch 420, as shown in FIGS. 18 and 19, may include the first and second terminals 421 and 422 which are spaced apart from each other and disconnected from each other within a hermetic space. When the magnet 410 approaches, the first and second terminals 421 and 422 may contact to be electrically connected to each other by the magnetic force, thereby generating a contact signal.

Figure 20:
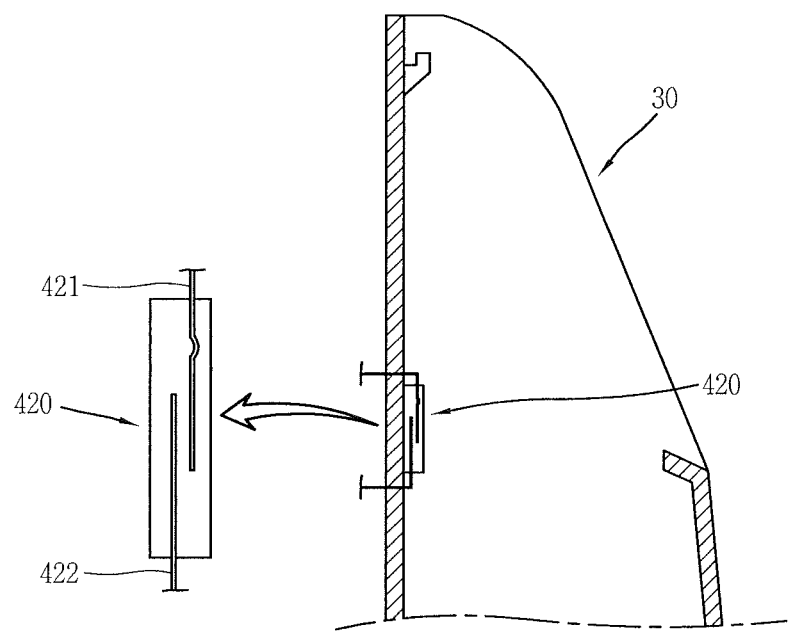
FIGS. 20 and 21 are views showing a sixth example filter insertion detecting device.
Figure 21:
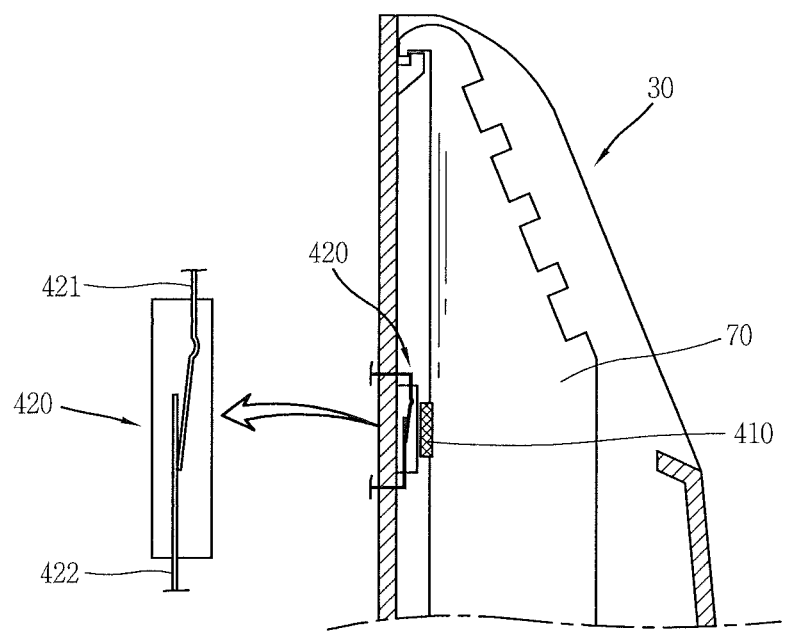

FIGS. 20 and 21 show a sixth example filter insertion detecting device installed in an example clothes treating apparatus. The clothes treating apparatus has the same configuration as that of the clothes drying machine described above, except for a different configuration of the filter insertion detecting device. Therefore, description of the same configuration is not repeated.

The reed switch 420 may be mounted onto the inner wall of the filter guide 30 and the magnet 410 may be mounted onto the outer wall of the filter assembly 70. When the filter assembly 70 is inserted, the magnet 410 mounted onto the filter assembly 70 may move close to the reed switch 420 so as to electrically connect the reed switch 420 by a magnetic force, thereby generating a contact signal.

This may allow, as similar to the examples described above employing the electrode sensor 100, for the detection as to whether or not a filter has been inserted in the filter guide 30, which does not have a filter cover 20, by way of mounting a separate member (e.g., the magnet 410 for electrical connection) to the filter assembly 70.

The foregoing implementations are merely exemplary and are not to be construed as limiting the present disclosure. The present teachings can be readily applied to other types of apparatuses. This description is intended to be illustrative. Many alternatives, modifications, and variations will be apparent to those skilled in the art. The features, structures, methods, and other characteristics of the examples described herein may be combined in various ways to obtain additional and/or alternative examples.

What is claimed is:

1. A clothes treating apparatus comprising:
   a drum defining a cavity that receives clothes to be dried;
   a cabinet that houses the drum and that defines an opening to enable loading of clothes into the drum and unloading of clothes from the drum;
   a filter assembly configured to filter foreign materials included in air discharged from the drum;
   a filter guide that defines a conduit that receives at least a portion of the filter assembly;
   a filter cover rotatably installed at the filter guide and configured to open and close the conduit defined by the filter guide based on insertion of the filter assembly into the filter guide and removal of the filter assembly from the filter guide; and
   a filter insertion detecting device configured to detect the insertion of the filter assembly into the filter guide based on rotation of the filter cover caused by the insertion of the filter assembly into the filter guide,
   wherein the filter insertion detecting device is configured to generate a contact signal caused by a magnetic force applied to the filter insertion detecting device in response to the rotation of the filter cover.

2. The apparatus of claim 1, wherein the filter insertion detecting device comprises:
   a lead switch comprising first and second terminals spaced apart from each other in an overlapping manner, the lead switch being electrically connected when the first and second terminals contact each other, and
   a magnet configured to apply a magnetic force that causes the first and second terminals of the lead switch to contact each other.

3. The apparatus of claim 2, wherein the first and second terminals contact each other by the magnetic force of the magnet based on the rotation of the filter cover caused by the insertion of the filter assembly into the filter guide.

4. The apparatus of claim 3, wherein a reed switch is mounted at the filter guide, and
   wherein the magnet is mounted on the filter cover.

5. The apparatus of claim 2, wherein the first and second terminals are disconnected from each other within a hermetic space.

6. The apparatus of claim 1, wherein the filter cover includes hinge shafts protruding from both sides thereof, each of the hinge shafts being inserted into a corresponding hinge shaft hole provided on a side wall of the filter guide.

7. The apparatus of claim 6, wherein the filter cover is configured to open and close the conduit defined by the filter guide as the hinge shaft is rotated in an inserted state in the hinge shaft hole.

8. The apparatus of claim 7, further comprising:
   a torsion spring disposed at the hinge shaft and provide an elastic restoring force to close the conduit.

9. The apparatus of claim 8, wherein the filter cover is configured to be stopped by the filter guide and maintain a closed state of the conduit by the torsion spring when the filter assembly is removed from the filter guide.

10. A clothes treating apparatus comprising:
    a drum defining a cavity that receives clothes to be dried;
    a cabinet that houses the drum and that defines an opening to enable loading of clothes into the drum and unloading of clothes from the drum;
    a filter assembly configured to filter foreign materials included in air discharged from the drum;
    a filter guide that defines a conduit that receives at least a portion of the filter assembly;
    a filter cover rotatably installed at the filter guide and configured to open and close the conduit defined by the filter guide based on insertion of the filter assembly into the filter guide and removal of the filter assembly from the filter guide; and
    a filter insertion detecting device configured to detect the insertion of the filter assembly into the filter guide based on rotation of the filter cover caused by the insertion of the filter assembly into the filter guide,
    wherein the filter insertion detecting device includes a switch configured to be pressed and generate a contact signal in response to the rotation of the filter cover caused by the insertion of the filter assembly into the filter guide.

11. The apparatus of claim 10, wherein the switch comprises:
    a button configured to electrically connect a circuit of a printed circuit board based on pressure applied to the button and electrically disconnect the circuit of the printed circuit board based on release of pressure applied to the button; and
    a pressing member configured to press the button based on the rotation of the filter cover caused by the insertion of the filter assembly into the filter guide.

12. The apparatus of claim 11, wherein the pressing member comprises:
    a pressing portion configured to press the button based on an external force applied to the pressing portion due to the rotation of the filter cover caused by the insertion of the filter assembly into the filter guide; and
    an elastic portion configured to release the button based on the external force being released due to removal of the filter assembly from the filter guide.

13. The apparatus of claim 11, wherein the switch is mounted at the filter guide, and
    wherein the filter cover is configured to press the pressing member based on the rotation of the filter cover caused by the insertion of the filter assembly into the filter guide.

14. The apparatus of claim 11, further comprising a pressing plate provided at the filter cover and configured to press the pressing member when the filter cover is rotated as the filter assembly is inserted into the filter guide.

15. The apparatus of claim 10, wherein the filter cover includes hinge shafts protruding from both sides thereof, each of the hinge shafts being inserted into a corresponding hinge shaft hole provided on a side wall of the filter guide, and
    wherein the filter cover is configured to open and close the conduit defined by the filter guide as the hinge shaft is rotated in an inserted state in the hinge shaft hole.

16. The apparatus of claim 15, further comprising a torsion spring disposed at the hinge shaft and configured to provide an elastic restoring force to close the conduit, and wherein the filter cover is configured to be stopped by the filter guide and maintain a closed state of the conduit by the torsion spring when the filter assembly is removed from the filter guide.

17. A clothes treating apparatus comprising:
a drum defining a cavity that receives clothes to be dried;
a cabinet that houses the drum and that defines an opening to enable loading of clothes into the drum and unloading of clothes from the drum;
a filter assembly configured to filter foreign materials included in air discharged from the drum;
a filter guide that defines a conduit that receives at least a portion of the filter assembly;
a filter cover rotatably installed at the filter guide and configured to open and close the conduit defined by the filter guide based on insertion of the filter assembly into the filter guide and removal of the filter assembly from the filter guide; and
a filter insertion detecting device configured to detect the insertion of the filter assembly into the filter guide based on rotation of the filter cover caused by the insertion of the filter assembly into the filter guide,
wherein the filter cover includes hinge shafts protruding from both sides thereof, each of the hinge shafts being inserted into a corresponding hinge shaft hole provided on a side wall of the filter guide.

18. The apparatus of claim 17, wherein the filter cover is configured to open and close the conduit defined by the filter guide as the hinge shaft is rotated in an inserted state in the hinge shaft hole.

19. The apparatus of claim 18, further comprising a torsion spring disposed at the hinge shaft and provide an elastic restoring force to close the conduit.

20. The apparatus of claim 19, wherein the filter cover is configured to be stopped by the filter guide and maintain a closed state of the conduit by the torsion spring when the filter assembly is removed from the filter guide.

* * * * *